(12) United States Patent
Vihriälä

(10) Patent No.: US 7,016,397 B1
(45) Date of Patent: Mar. 21, 2006

(54) METHOD OF PROCESSING CDMA SIGNAL COMPONENTS

(75) Inventor: Jaakko Vihriälä, Oulu (FI)

(73) Assignee: Nokia Networks Oy, Espoo (FI)

( * ) Notice: Subject to any disclaimer, the term of this patent is extended or adjusted under 35 U.S.C. 154(b) by 854 days.

(21) Appl. No.: 09/830,881

(22) PCT Filed: Sep. 1, 2000

(86) PCT No.: PCT/FI00/00739

§ 371 (c)(1),
(2), (4) Date: May 2, 2001

(87) PCT Pub. No.: WO01/18985

PCT Pub. Date: Mar. 15, 2001

(30) Foreign Application Priority Data

Sep. 2, 1999 (FI) .................................. 19991871

(51) Int. Cl.
*H04B 1/69* (2006.01)
*H04L 27/30* (2006.01)
*H04J 13/00* (2006.01)

(52) U.S. Cl. ....................... 375/143; 144/150; 370/320
(58) Field of Classification Search ................ 375/143, 375/148, 207, 150–153, 144; 370/335, 342, 370/500, 320; 455/295, 506, 436
See application file for complete search history.

(56) References Cited

U.S. PATENT DOCUMENTS

| | | | |
|---|---|---|---|
| 5,673,286 A * | 9/1997 | Lomp .......................... | 375/148 |
| 5,889,815 A * | 3/1999 | Iwakiri ........................ | 375/148 |
| 5,936,999 A | 8/1999 | Keskitalo | |
| 5,943,362 A | 8/1999 | Saito | |
| 6,085,104 A * | 7/2000 | Kowalski et al. ........... | 455/506 |
| 6,363,104 B1 * | 3/2002 | Bottomley ................... | 375/148 |
| 6,404,760 B1 * | 6/2002 | Holtzman et al. .......... | 370/342 |
| 6,680,967 B1 * | 1/2004 | Westman ..................... | 375/148 |

FOREIGN PATENT DOCUMENTS

WO      WO 00/41338      7/2000

OTHER PUBLICATIONS

Kaasila et al., "The Adaptive Rake Matfhed Filter in a Time-Variant Two-Path Channel," 1992, IEEE, pp 441-445.
"ETSI UMTS Terrestrial Radio Access (UTRA) ITU-R RTT Candidate Submission," Tdoc SMG2 260/98, May/Jun. 1998.

* cited by examiner

*Primary Examiner*—Amanda T. Le
*Assistant Examiner*—Lawrence B. Williams
(74) *Attorney, Agent, or Firm*—Pillsbury Winthrop, LLP

(57) ABSTRACT

The invention relates to a method of processing multipath-propagated components of a signal in a communications system. In the method, a signal transmitted on the radio channel of the communications system is received in a RAKE receiver and an impulse response of the radio channel is formed. In the method, one or more taps having the highest signal energy in the impulse response are located and matched to a short matched filter. A weighting value for the impulse response is calculated on the basis of the one or more taps in the matched filter and a deviation between the weighting value and the center point of the matched filter is compared with a threshold value set for the deviation. The matched filter is moved toward the deviation when the deviation exceeds the threshold value set for the deviation.

18 Claims, 6 Drawing Sheets

METHOD OF PROCESSING CDMA SIGNAL COMPONENTS

This application is the National Phase of International Application PCT/FI00/00739 filed Sep. 1, 2000 which designated the U.S. and that the International Application was published under PCT Article 21(2) in English.

FIELD OF THE INVENTION

The invention relates to a radio system and a method of processing multipath-propagated signal components. The invention relates in particular to a RAKE receiver of a radio system implemented by a spread spectrum technique.

BACKGROUND OF THE INVENTION

In radio systems, such as mobile systems, a radio signal between a mobile phone and a base station propagates along several routes between a transmitter and a receiver. The signal may propagate directly from the mobile phone to the base station, provided there are no obstacles between them. In urban environments, buildings, cars and other obstacles cause reflection and scattering of the radio signal. Multipath-propagated components of a signal may thus propagate distances of various lengths on the radio path, resulting in that the components arrive at the receiver at different times. Some radio systems, such as radio systems implemented by a spread spectrum technique and employing code division multiple access (CDMA), can utilize this multipath-propagation. In such a case, the receiver receives each multipath-propagated signal component, and by amplifying and combining the components, the transmitted original signal can be better identified.

In CDMA, each signal comprises an individual spreading code which modulates the baseband while spreading the frequency band of the data signal. Data signals of several users are transmitted simultaneously on one and the same frequency band and the users are distinguished by the spreading code. Correlators in receivers synchronize themselves to a desired signal which they identify by the spreading code, and return the frequency band of the signal to the original one. Signals, which contain another spreading code, arriving at a receiver do not, in an ideal situation, correlate but keep their wide frequency band and are thus received as noise in the receivers. The aim is to select the spreading codes used by the system so that they are orthogonal with respect to each other, i.e. do not correlate with each other. One user can have one or more spreading codes depending on the required transmission capacity.

A RAKE receiver made up of one or more RAKE fingers, i.e. correlators, is generally used as a CDMA receiver. RAKE fingers are independent receiver units whose task is to despread and demodulate one received multipath-propagated signal component. In addition to the RAKE fingers intended for receiving signals, a CDMA receiver typically has at least one separate searcher whose task is to search for the various signal components transmitted with a desired spreading code, to identify their phases and to allocate the signal components to the RAKE fingers. The searcher is implemented according to prior art, for instance by means of a matched filter (MF). In practice, the length of a matched filter in a searcher finger is 256 spreading code units, i.e. chips, because the phase of the received signal is not known. Each RAKE finger can be directed to correlate with a signal component propagated along a different route, each component arriving at the receiver delayed in a slightly different manner. The RAKE fingers are directed by giving the correlator information on the desired spreading code and its phase.

After starting to receive a signal, according to prior art, a RAKE finger keeps its spreading code synchronized to the incoming signal of the finger using the known early-late code tracking loop, for instance. The receiver then has three correlators: one tracks the incoming signal exactly synchronized to it, a second synchronizes itself to the early phase of the spreading code, which is a phase preceding the current phase by half a chip, for instance, and a third synchronizes itself to the late phase which is a phase delayed by half a chip from the current phase.

A receiver solution in which each RAKE finger tracks the changes in the delay of its own code phase, has significant drawbacks, because in connection with RAKE fingers, the implementation of the correlators and tracking the delay increase considerably the complexity of the implementation of the finger. A further considerable drawback in prior art solutions is that when the fingers track independently their signal components propagating in different directions, the components have a tendency to merge, whereby two different fingers synchronize themselves to the same spreading code phase. One prior art solution, a matched filter of a traffic channel, which is relatively long, has increased the complexity of the receiver of the searcher on account of the required computational power, thus also increasing the requirements set on the equipment.

BRIEF DESCRIPTION OF THE INVENTION

It is an object of the invention to implement an improved method and apparatus for processing a multipath-propagated signal in a CDMA radio system. This is achieved by a method, described in the following, of processing multipath-propagated signal components in a communications system, in which a signal transmitted on a radio channel of the communications system is received in a RAKE receiver and an impulse response is formed in a delay estimator of the RAKE receiver on the basis of the received signal by correlating the received signal with a first matched filter. In the method, one or more impulse response taps having the highest signal energy is located, said one or more taps are matched to a second matched filter which is shorter than the first matched filter, a weighting value is calculated on the basis of the one or more taps in the second matched filter for the impulse response using statistical methods, a deviation between the weighting value and a centre point of the second matched filter is compared with a threshold value set for the deviation, the second matched filter is moved forward when the deviation exceeds the threshold value set for exceeding the deviation, the second matched filter is moved backward when the deviation undershoots the threshold value set for undershooting the deviation, said four last steps are repeated during the reception of the signal.

The invention also relates to a RAKE receiver in a communications system, which receiver comprises means for receiving a signal transmitted on a radio channel of the communications system, one or more delay estimators for forming an impulse response of the radio channel on the basis of the received signal by correlating the received signal with a first matched filter, and one or more correlators for tracking a multipath-propagated component of the received signal. The RAKE receiver further comprises means for locating one or more taps of the impulse response having the highest signal energy, means for matching said one or more taps to a second matched filter which is shorter than the first matched filter, means for comparing a deviation between a weighting value and a centre point of the second matched filter with a threshold value set for the deviation, means for moving the second matched filter forward when the deviation exceeds the threshold value set for exceeding the deviation, means for moving the second matched filter backward when the deviation undershoots the threshold value set for undershooting the deviation, and means for repeating said four last steps during the reception of the signal.

It is an object of the invention to remove the problems related to the need for a long matched filter in the reception of a traffic channel of a radio receiver implemented by a spread spectrum technique. A further object of the invention is to simplify the operation of the fingers, i.e. correlators, of the receiver to such an extent that they need not track the phase of their own spreading code.

In radio systems implemented by a spread spectrum technique and employing code division multiple access, receivers can utilize multipath-propagated signal components in such a manner that the components are received with different delays and combined, whereby the original signal can be amplified. The present invention relates to the above-mentioned receivers, without, however, being restricted to the multiple access method being a pure CDMA, the multiple access method can also be a TDMA or FDMA combined with the CDMA.

In a preferred embodiment, the invention can be implemented in a RAKE-type receiver having one or more searchers, i.e. delay estimators, and one or more fingers. The task of a searcher is to find the multipath-propagated signal components and their delays and to allocate the signal components in question to correlators which track the spreading code phases allocated to them. One task of a searcher in finding the multipath-propagated components is to find the correct code phase by means of a matched filter. A signal is received as input into the matched filter and samples are taken from it. The samples are correlated with predefined data, such as a part of a spreading code. The input signal multiplied by a spreading code is obtained as output from the matched filter. The spreading code used in the matched filter must be relatively long, 256 spreading code units, or chips, for instance, on a random access channel (RACH) in which a terminal within the service area of a cellular radio network transmits a connection request to the network. As a result of the contact on the random access channel, the receiver is able to synchronize itself to the signal, and consequently, it can use a shorter section of the spreading code, which speeds up the processing of the information received on the traffic channel. Further, an impulse response for the radio channel is formed in the searcher to estimate the interference caused by the radio path to the signal. The impulse response can be formed by means of pilot symbols transmitted on the channel and known by the receiver. How and on the basis of which information the impulse response of the channel is formed in the searcher, is not essential for the invention. The impulse response depicts the signal energy of the multipath-propagated components and the delay of the components. On the basis of the found delays, the best signal components depicted by the impulse response are allocated according to prior art to be tracked by the correlators, of which there are preferably 1 to 5, but it is also possible to have more of them in the receiver.

The basic idea of the invention is to calculate a weighting value for the impulse response on the basis of the impulse response of the channel. According to one embodiment, the weighting value is a weighted average of the impulse response of a short matched filter in such a manner that the value to be weighted is the location of the impulse response tap, or index, and the weight is the strength of the tap, i.e. signal strength. The centre of gravity of the impulse response can be defined on the basis of the weighted average so that it makes the use of a short matched filter possible. In an embodiment, the spreading code of a matched filter used in the reception of a traffic channel is 32 units, or chips.

One embodiment of the invention further involves controlling the delays of the code phases of the fingers according to the centre of gravity of the impulse response. In such a case, the fingers do not independently track the changes occurring in the delays of their signal components, but the searcher informs all fingers of a change in the centre of gravity of the impulse response, whereby the fingers can change their own timing accordingly.

The invention provides several advantages. Using a short matched filter in the searcher in the reception of the traffic channel reduces considerably the calculations required in timing the receiver to the spreading code. The implementation of the fingers is also significantly simplified when the fingers need not track the delays of their signal components themselves.

BRIEF DESCRIPTION OF THE FIGURES

In the following, the invention will be described by means of preferred embodiments and with reference to the attached drawings in which.

DETAILED DESCRIPTION OF THE INVENTION

The invention can be used preferably in different mobile telephone systems implemented by a spread spectrum technique, and the invention is here described in a universal mobile telephony system (UMTS) employing wideband code division multiple access, without limiting the invention to it, however. The examples presented in the description of the invention are based on the description of the Wideband CDMA system.

Figure 1:
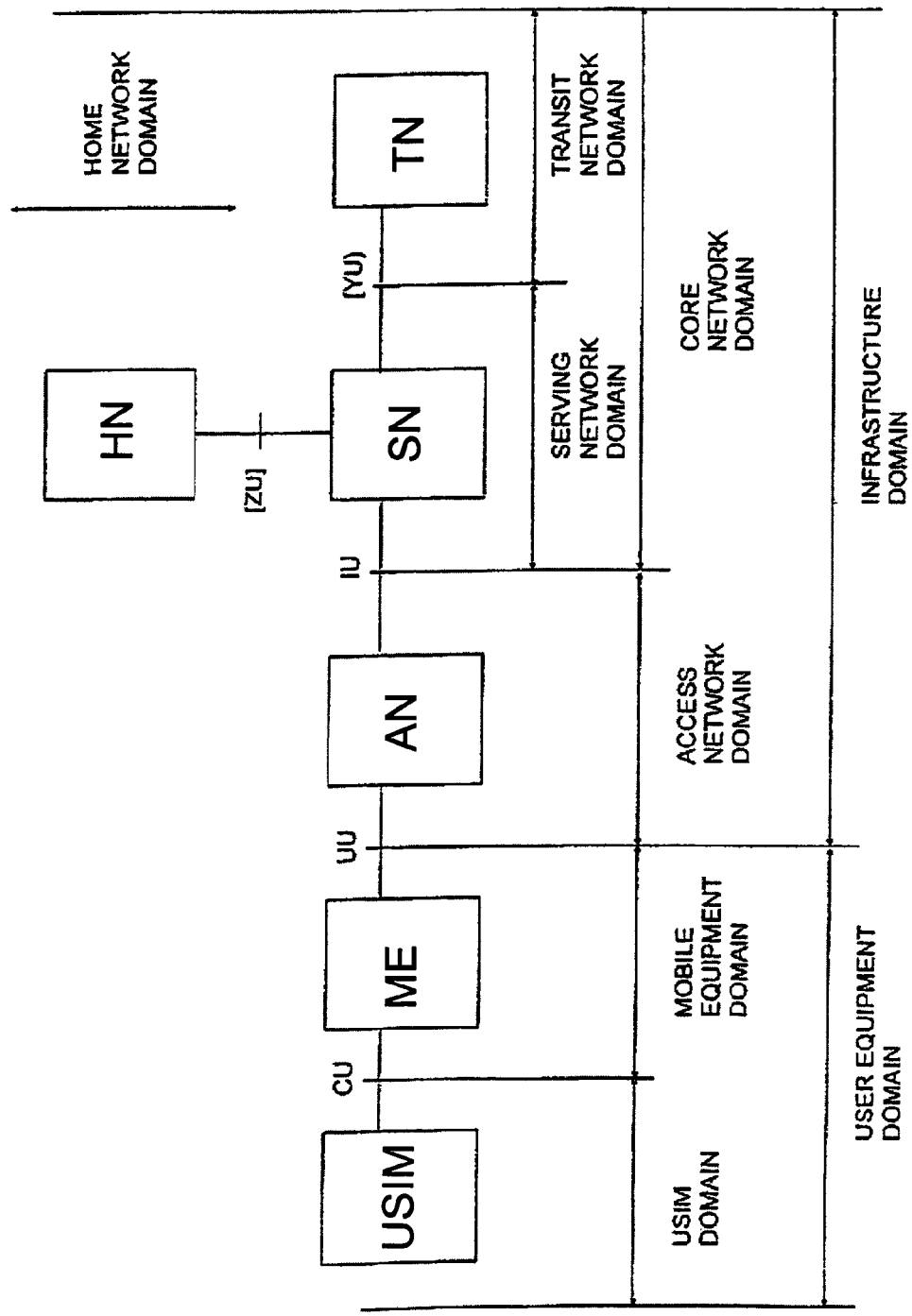
FIG. 1 shows the principle of a UMTS mobile telephone system.
Figure 2:
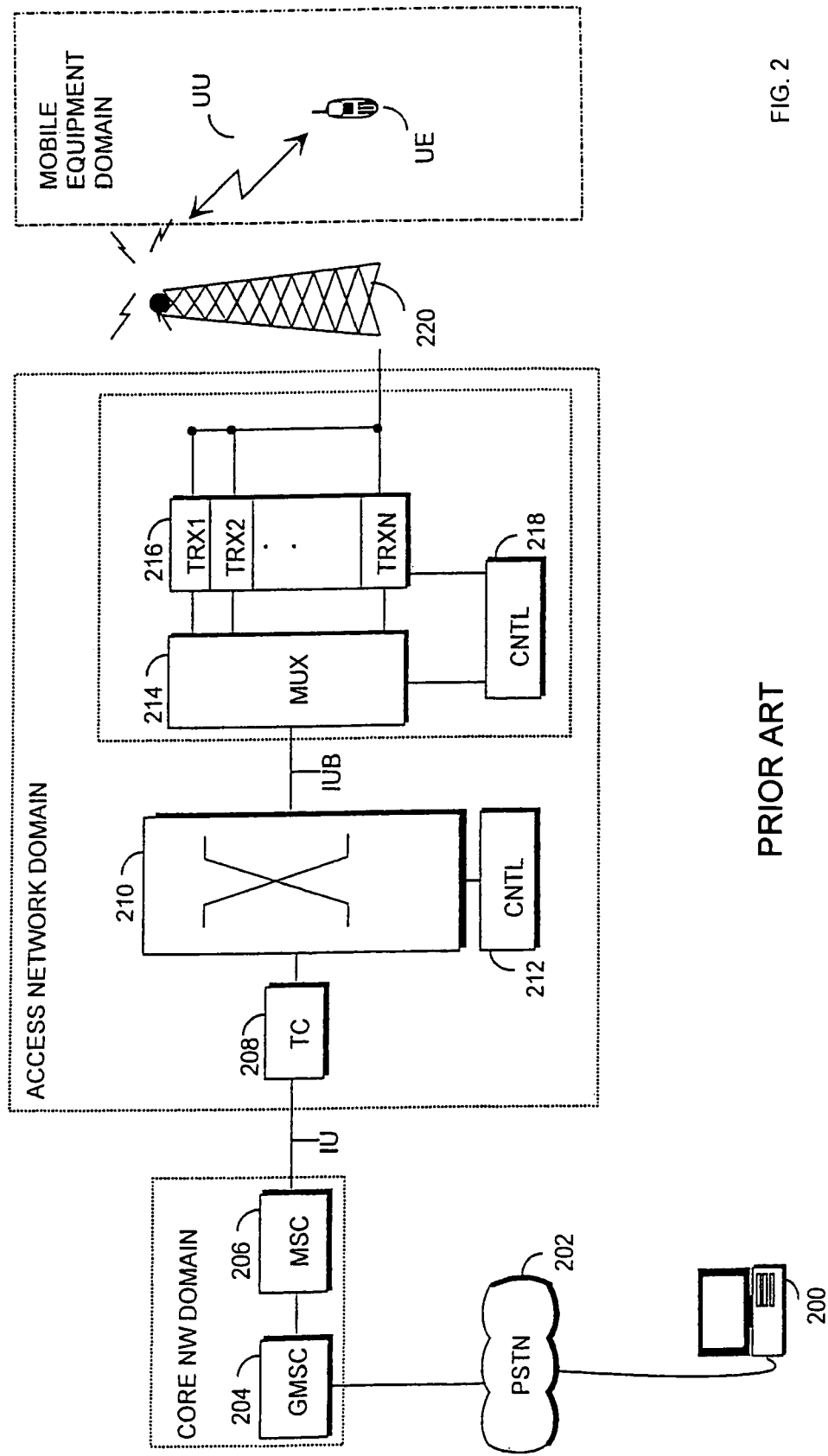
FIG. 2 shows a UMTS mobile telephone system depicted by means of a GSM network.

The structure of the UMTS is described by means of FIGS. 1 and 2. FIG. 1 shows the structure of the UMTS on a rough level, so it is clarified by means of FIG. 2 by showing which part of the known GSM system corresponds approximately to which part of the UMTS. It is clear that the presented comparison is in no way binding, but provides a guideline, since the responsibilities and functions of the different parts of the UMTS are still being designed. The figures only contain the blocks that are essential for describing the invention, but it is obvious to a person skilled in the art that a conventional mobile telephone system also contains other functions and structures which need not be described in more detail herein.

The UMTS is as shown in FIG. 1 divided structurally into system parts, the main division being between the terminal and infrastructure. In this context, a terminal refers to a mobile telephone, a portable computer or a domestic appliance adapted to a telecommunications network. A terminal can further be divided into two subsections, mobile equipment ME and a user services identity module USIM, the interface between them being called Cu. The mobile equipment ME performs the facilities of the radio interface and also contains a number of other facilities, such as connecting the mobile equipment to a portable computer. The user service identity module contains data and functions for identifying users in the radio system. The USIM also makes it possible for the user to change the used terminal in the manner known from the SIM card of the GSM system. The infrastructure subsection is divided into an access network (AN) domain and a core network domain, the interface between them being called Iu. The access network (AN) domain, also called the UTRAN (UMTS terrestrial radio network), comprises physical equipment and mechanisms with which the user can use the network, whereas the core network domain is responsible for network management at a higher level, for instance management of user location information, data transmission and signalling. The core network domain is divided into three subsections, a serving network SN, a home network HN and a transit network TN. The serving network SN handles call routing and user data transmission between the information source and destination. The serving network SN is also connected to the home network HN and transit network TN. The home network HN handles network functions which are based on a permanent location. The transit network TN handles connections outside the UMTS network in the cases where the other party of the connection resides outside the UMTS network.

According to FIG. 2, a circuit-switched connection can be established from the user equipment UE to a subscriber terminal 200 connected to a public switched telephone network PSTN 202. A base station 220 has a multiplexer 214, transceivers 216 and a control unit 218 which controls the operation of the transceivers 216 and the multiplexer 214. With the multiplexer 214, the traffic and control channels used by several transceivers 216 are placed on a transmission link Iub which is an interface between a base station and a serving switching centre. The transceivers 216 of the base station 220 are connected to an antenna unit with which a bi-directional radio link Uu is implemented to the subscriber equipment Ue. The antenna unit of a base station is usually implemented with at least one diversity antenna, in which case an uplink, for instance, has two locally separate antenna branches utilizing the diversity of a signal.

A telephone exchange, i.e. a group switch, 210 is connected to a control unit 212 which typically manages the following: radio resources, control of handovers between cells, power control, timing and synchronization, and paging subscriber terminals. The group switch 210 is used to switch speech and data and to connect signalling circuits. The base station system 220 also comprises a transcoder 208 usually located as close as possible to a mobile switching centre 206, because speech can then be transmitted between the mobile switching centre 206 and the group switch 210 in mobile system format, thus saving transmission capacity. The transcoder 208 transforms different digital speech coding formats used between a public telephone network and a radio telephone network to suit each other, for instance from the 64 kbit/s format of a fixed network to a cellular radio network format (e.g. 13 kbit/s) and vice versa. In FIG. 2, the core network domain is made up of an infrastructure external to the UTRAN and belonging to a mobile telephone system. Of the apparatuses of the core network domain, FIG. 2 shows the mobile switching centre 206 and a gateway mobile switching centre 204 which handles the connections of the mobile telephone system to an external telecommunications network, in this case the public telephone network 202.

The radio interface Uu between the user equipment UE and the UTRAN is a three-layered protocol stack whose layers are a physical layer L1, a data link layer L2 and a network layer L3. The L2 is further divided into two sub-layers, a link access control layer LAC and a medium access control layer MAC. The network layer L3 and the LAC are further divided into control (C) and user (U) layers. The physical layer L1 provides data transmission services for transport channels, the MAC and higher layers. The L2/MAC layer transmits information between physical transport channels and logical channels higher in the protocol stack. There are different types of logical channels, such as control channels and traffic channels, in the UMTS system like in other digital radio systems. Some of the radio channels are in the uplink direction from the user equipment to the cellular radio system, whereas some are in the downlink direction from the mobile telephone system to the user equipment. On a control channel, no radio resources are reserved for the user equipment, but control channels handle matters related to the use of the system, such as paging user equipment on a common paging channel PCH. In the uplink direction, one control channel acts as a random access channel (RACH) on which the user equipment requests connection establishment from the network. Radio resources are reserved for actual traffic channels for the user equipment depending on the data transmission need. One logical traffic channel is a dedicated channel DCH on which information is transmitted from the radio system to the user equipment. A UMTS radio system comprises numerous other channels, too, but their description herein is not essential for the invention.

Frame and burst structures used on the physical channels differ from each other depending on which physical channel they are transmitted. A frame refers here to an entity including several bursts, in which case the second time-slot in each frame can, for instance, be reserved for one user for transmitting the burst. One example of a frame is the PDPCH physical channel frame of the UMTS time division duplex (TTD) mode, whose length is 10 milliseconds and the frame is divided into sixteen time-slots each having a length of 0.625 milliseconds. A data packet transmitted in a time-slot is called a burst. One burst described above can contain 2560 chips of information with chips 0 to 1103 containing data, chips 1104 to 1359 containing a midamble, chips 1360 to 2463 containing again data and at the end of the burst, there is a 96 chips long guard period. The data in the midamble is often also called a training sequence or a pilot.

A training sequence is a number of symbols known by the receiver and it is transmitted to the user equipment from the network on a forward access channel FACH, for instance, prior to the actual connection establishment. This training sequence received by the user equipment can be used during the connection in both downlink and uplink direction, but different training sequences can also be used for the different transmission directions. When receiving bursts on a channel, a receiver, which can be user equipment or a radio network base station, makes a channel estimate, i.e. impulse response, on the basis of the training sequence. Making a channel estimate means that the receiver tries to estimate how the radio path has distorted the data contents of the burst. On the basis of the received information, the receiver can, using known methods, try to correct the data contents of the burst according to the channel estimate. By means of the training sequence and the impulse response formed from it, the channel quality can be estimated using known methods, such as the C/I ratio (carrier/interference), SIR (signal interference ratio), bit error rate, or by examining the ratio of the chip energy to the interference power density $E_c/I_0$.

Figure 3:
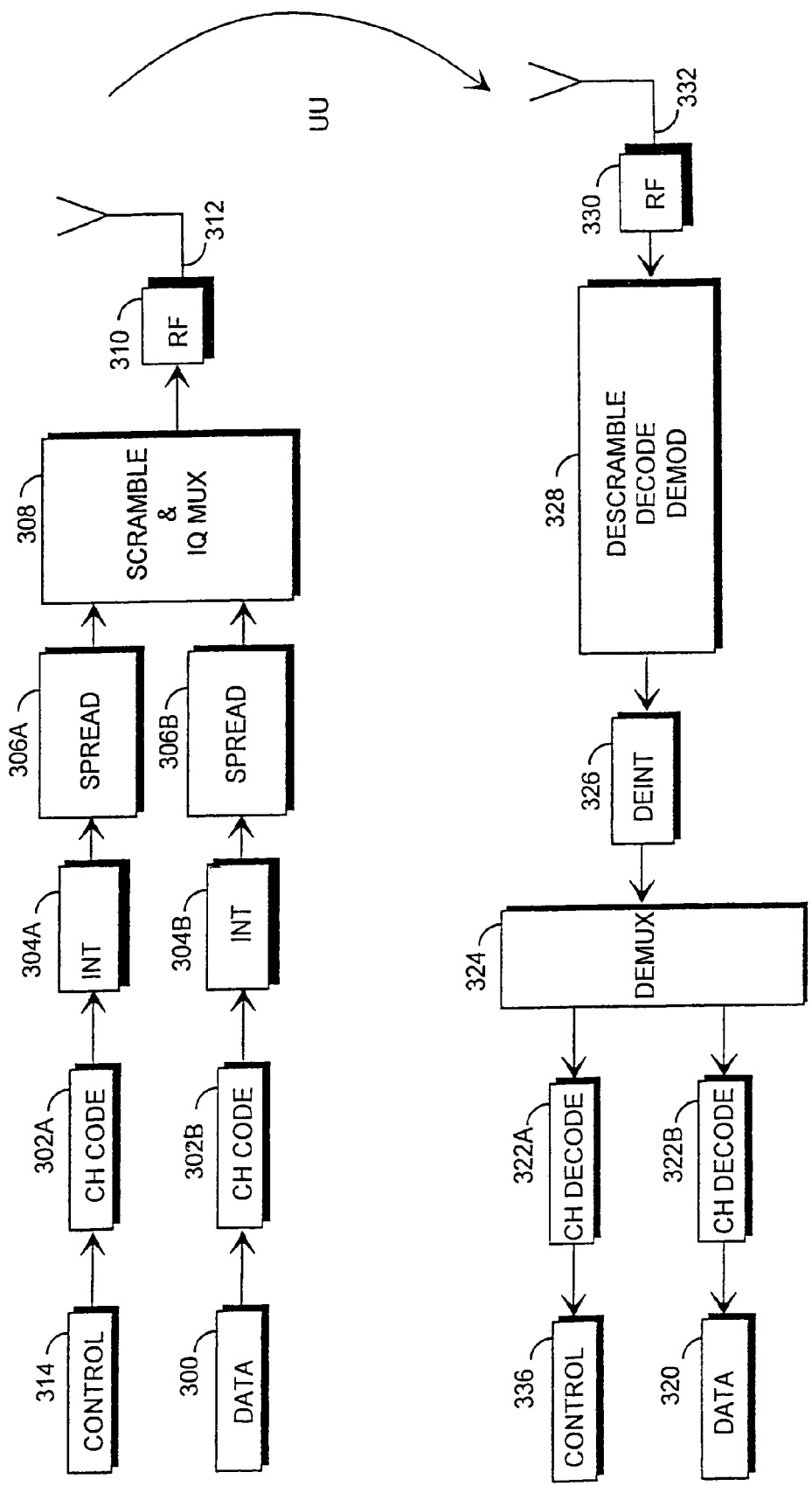
FIG. 3 shows the operation of a transmitter-receiver pair.

The following describes by means of FIG. 3 the operation of a radio transmitter—radio receiver pair on a general level. The radio transmitter can reside in a base station or in user equipment UE, and the radio receiver can also reside in user equipment UE or in a base station. The top part of FIG. 3 shows the essential functions of the radio transmitter in such a manner that the processing steps of the control channel are on top and below them are the processing steps of the data channel before the channels are combined and transmitted to the physical channel of the radio link. Pilot bits which form the training sequence of the burst and which the receiver uses in channel estimation, are located in the control channel 314. User data 300 is located in the data channel. The channels are channel-coded in blocks 302A and 302B. Different block codes, for instance, are channel coding, one example being the cyclic redundancy check (CRC). In addition, convolution coding is typically used and its different variations, such as punctured convolution coding or turbo coding. Pilot bits are, however, not channel-coded, because the intention is to find out the distortions caused by the channel to the signal. When the different channels have been channel-coded, they are interleaved in an interleaver 304A, 304B. The purpose of the interleaving is to facilitate error correction. In interleaving, the bits of difference services are scrambled in a certain way together so that a momentary fade on the radio path does not necessarily yet make the transmitted information unidentifiable. The interleaved bits are spread with a spreading code in blocks 306A, 306B. The chips obtained in this manner are scrambled with a scrambling code and modulated in block 308, and the separate signals received from different channels are also combined in block 308 for transmission through the same transmitter. Finally, the combined signal is taken to radio frequency parts 310 which may comprise different power amplifiers and filters restricting bandwidth. A closed loop control used in transmission power control usually controls a transmission power control amplifier in this block. An analogue radio signal is transmitted through an antenna 312 to the radio path Uu.

The bottom part of FIG. 3 shows the essential functions of the radio receiver. The radio receiver is typically a RAKE receiver whose operation is described in connection with the description of the invention in FIG. 4. An analogue radio frequency signal is received from the radio path Uu with an antenna 332. The signal is taken to radio frequency parts 330 which comprise a filter preventing frequencies outside the desired frequency band. After this, the signal is converted to an intermediate frequency in block 328 or directly to baseband, and the converted signal is sampled and quantized. Because this is a multipath-propagated signal, the signal component propagated along different routes are combined, if possible, in block 328 which according to prior art comprises the actual RAKE fingers of the receiver. The interleaving of the received physical channel is removed in deinterleaving means 326 and the deinterleaved physical channel is divided in a demultiplexer 324 into data streams of different channels. The channels are directed each to its own channel-decoding block 322A, 322B in which the channel coding used in transmission, for instance block coding and convolution coding, is decoded. Each transmitted channel can then be taken to any necessary further processing. The system control channels are taken to a control part 336 of the radio receiver.

The information to be transmitted to a radio channel is multiplied by a spreading code, thus spreading a relatively narrowband information to a wide frequency band. Each link Uu has its own spreading code or codes with which the receiver identifies transmissions intended for it. Typically, there are a maximum of 256 different mutually orthogonal spreading codes in use simultaneously. For instance, if the UMTS uses a five megahertz carrier at the speed of 4.096 megachips per second in the downlink direction, the spreading factor 256 corresponds to a transmission speed of 32 kbit/s, and respectively, the highest practical transmission speed is achieved by spreading factor 4, whereby the data transmission speed is 2048 kbit/s. Accordingly, the transmission speed on the channel varies stepwise from 32, 64, 128, 256, 512, 1024 to 2048 kbit/s, the spreading factor being 256, 128, 64, 32, 16, 8 and 4, respectively. The data transmission speed at the user's disposal depends on the channel coding used. For instance, if ⅓ convolution coding is used, the user's data transmission speed is about one third of the data transmission speed of the channel. The spreading factor indicates the length of the spreading code. For instance, the spreading code corresponding to the spreading factor one is (1). The spreading factor two has two mutually orthogonal spreading codes (1,1) and (1,−1). Further, the spreading factor four has four mutually orthogonal spreading codes: below an upper level spreading code (1,1), there are spreading codes (1,1,1,1) and (1,1,−1,−1), and below a second upper level spreading code (1,−1), there are spreading codes (1,−1,1,−1) and (1,−1,−1,1). The formation of spreading codes is continued in this way when moving to lower levels of a code tree. The spreading codes of a given level are always mutually orthogonal. Likewise, a spreading code of a given level is orthogonal to all the spreading codes derived from another spreading code of the same level to the next levels. In transmission, one symbol is multiplied by a spreading code, whereby the data spreads to the used frequency band. For instance, when using the spreading code 256, 256 chips represent one symbol. Correspondingly, when using the spreading code 16, 16 chips represent one symbol.

Figure 4:
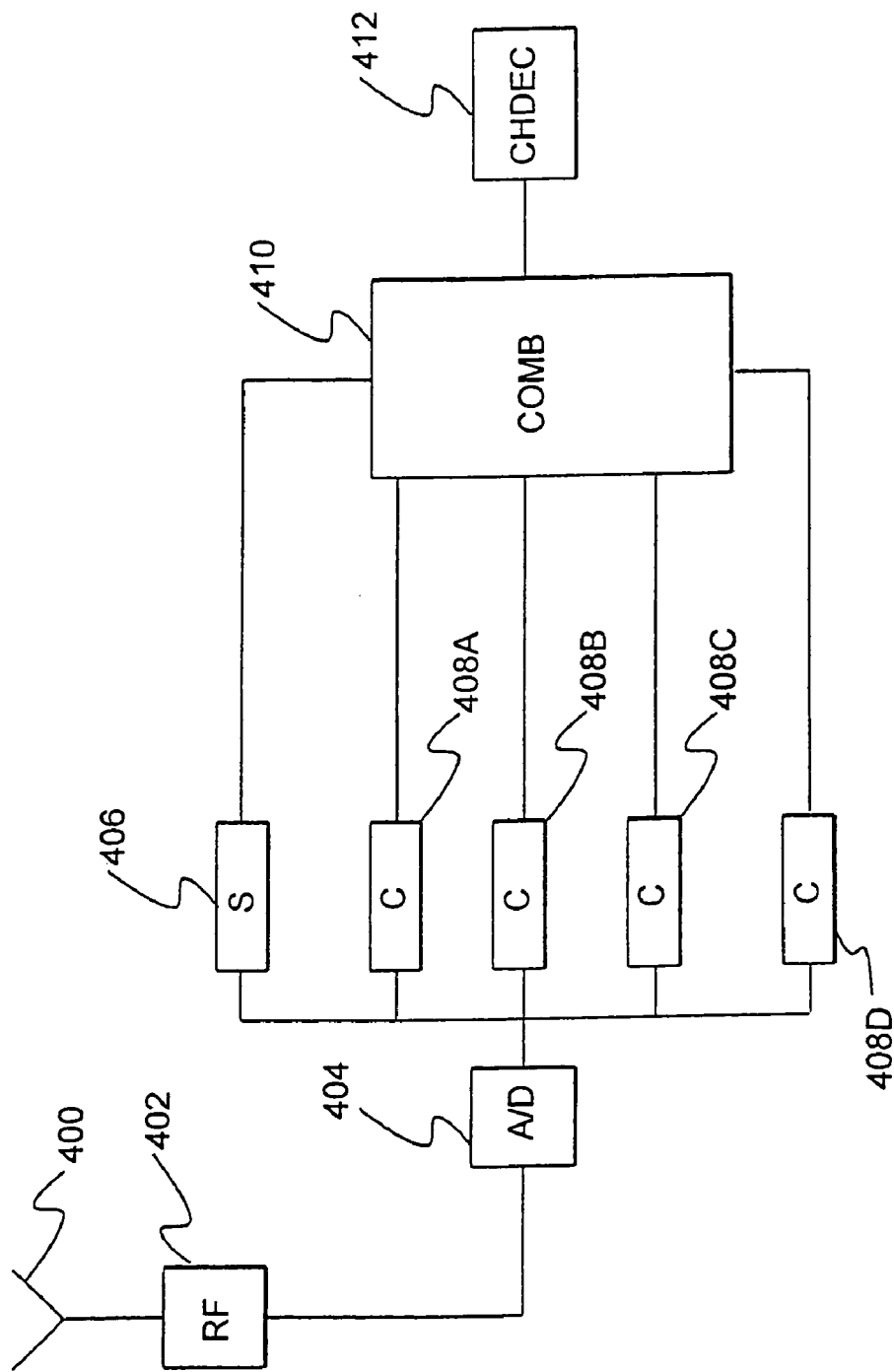
FIG. 4 shows the structure of a RAKE receiver.

FIG. 4 shows the parts of one embodiment of a RAKE receiver that are essential for the invention. A conventional CDMA receiver generally has 1 to 5 RAKE fingers, each listening for one multipath-propagated component of a received signal. Due to the mobile nature of a radio telephone, the propagation environment between a base station and the radio telephone varies continuously and the strength and number of the multipath-propagated signals change with the location of the radio telephone. With reference to FIG. 4, the received signal is taken in the RAKE receiver after an antenna receiver 400 and radio frequency parts 402 to an A/D converter 404. The multipath-propagated components of the received signal are found in the searcher 406 by forming an impulse response for the channel. The searcher defines the delays of the different signal components from the impulse response and allocates the components to the RAKE receiver fingers 408A to 408D to track. Forming the impulse response is done according to prior art and is not essential for the invention. In one embodiment, the searcher 406 tracks the quality of the connection according to a known quality assessment method, such as the bit error rate (BER) and re-allocates the fingers 408A to 408D, if the BER decreases below a pre-set threshold value. One alternative is to re-allocate the fingers regularly. During connection establishment, a correlator in the searcher 406 tries to synchronize itself to the training sequence spread by a spreading code to form the impulse response. For a burst received on a RACH channel, for instance, a relatively long matched filter, such as a 256 chips long filter, is used in the searcher so that the correct phase of the spreading code would be found as quickly as possible. After having synchronized to the correct phase, the matched filter of the searcher can be shortened to 32 chips, for instance, for traffic channel reception. The signals received from different correlators are combined in a combiner 410, after which the signal is transmitted to a decoding part 412. FIG. 4 shows the essential parts of the structure of an antenna receiver having one antenna branch. It is obvious that antenna diversity can be utilized in an antenna receiver of a base station, in which case there are more than one antenna branches.

Figure 5:
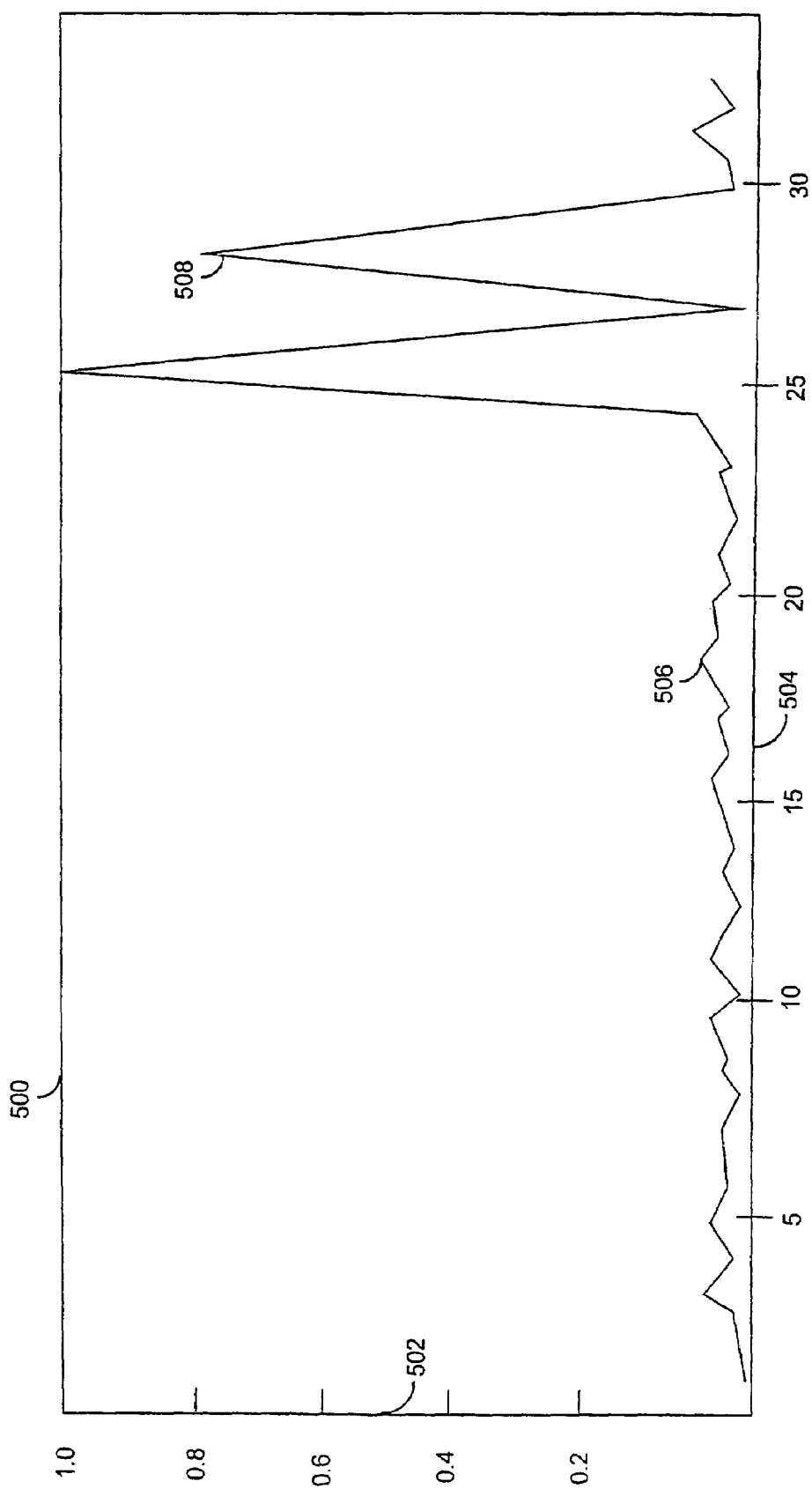
FIG. 5 shows a channel estimate matched to a short matched filter.
Figure 6:
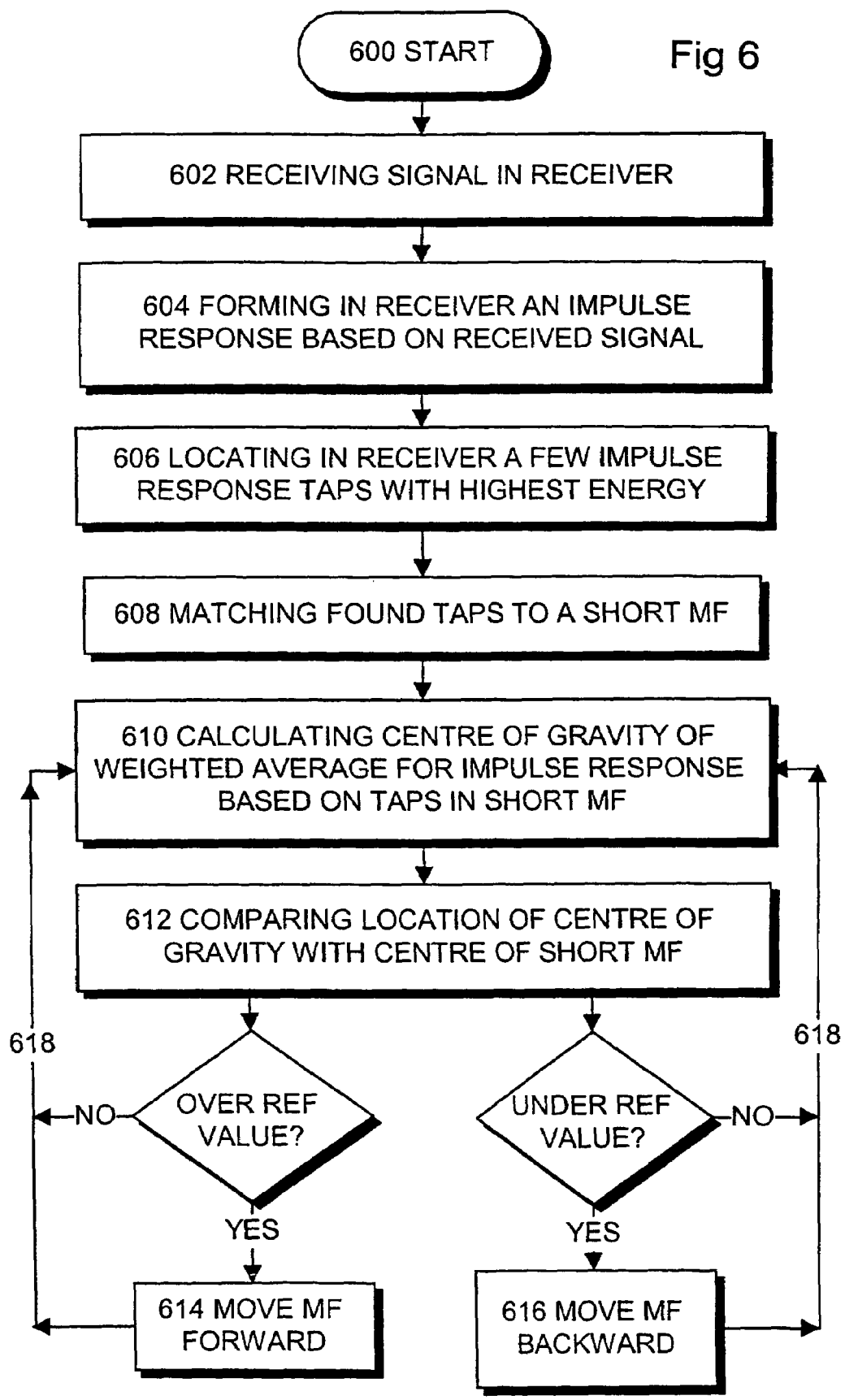
FIG. 6 shows a flow chart of an embodiment of the invention.

The parts of operation of the RAKE receiver shown in FIG. 4 that are essential for the invention are described next by means of FIGS. 5 and 6. In the starting step 600 of FIG. 6, a base station receiver of an embodiment of the invention is ready to receive a RACH burst on a RACH channel from a mobile phone located within the service area of the base station. In step 602, the signal arrives at the receiver whose searcher correlates with the signal by means of a long matched filter. The impulse response of the channel is also formed in the receiver on the basis of the received signal according to step 604. Taps having the highest energy are found from the impulse response pattern according to step 606, according to which taps, a short matched filter is adapted for traffic channel reception in step 608. FIG. 5 shows an example of an impulse response pattern which is matched to a 32 chips long short matched filter 500. The Y axis 502 shows the signal energy where value 1 represents the maximum energy. The X axis 504 shows the length of the matched filter in chips, and in the example, it is 32 chips. The curve 506 thus represents the energy of the impulse response in proportion to the location of the matched filter in chips. The figure shows that the impulse response pattern has two high peaks, one of which is marked as 508. It is essential for the invention to keep the two peaks in FIG. 5, for instance, inside the short matched filter 500, in which case the short matched filter can be used in traffic channel reception. The use of a short matched filter is advantageous, because the shorter the filter, the less correlation calculations are needed in the receiver during signal reception. According to the invention, a weighting value of the impulse response is calculated on the basis of the impulse response pattern in the short matched filter, using methods of statistical analysis. With reference to step 610 of FIG. 6, said method of statistical analysis refers, according to a preferred embodiment of the invention, to the calculation of a weighted average of the impulse response according to formula (1), $$C_g = \frac{\sum_{k=1}^{N_{ir}} k \cdot R_k}{\sum_{k=1}^{N_{ir}} R_k}, \text{ wherein} \quad (1)$$

$C_g$ is the centre of gravity of the impulse response, $R_k$ is the energy of the impulse response tap, k is the index of the impulse response tap and $N_{ir}$ is the length of the impulse response window. According to an embodiment of the invention, the centre of gravity of the impulse response can be calculated at intervals of 10 ms, for instance, after which the centre of gravity can, as in FIG. 5, be moved to index point 16 when the length of the matched filter is 32 chips. Formula (1) shows that all the different index values of the short matched filter are used in calculating the centre of gravity, whereby the effect of low taps, i.e. noise, is relatively high. According to one embodiment of the invention, only the taps which have the highest energy are included in calculating the centre of gravity, in FIG. 5, for instance, only two taps would be included in the calculation. According to one embodiment, the centre of gravity can also be calculated as an average of the delays of the allocated RAKE fingers. Then the strength of the signal at a certain moment does not affect the calculation, but only the fact whether a decision has been made to allocate a RAKE finger for the signal component. According to step 612 of FIG. 6, in one embodiment of the invention, a threshold value $N_s$ is set for a weighting value change, which it should exceed before the location of the second matched filter is changed. After calculating the weighting value, the change in the weighting value is compared with the threshold value $N_s$ and if $$C_g < \frac{N_{ir}}{2} - \frac{N_{ir}}{N_s},$$

the code phase is changed $N_s$ chips backwards according to step 614, and if $$C_g > \frac{N_{ir}}{2} + \frac{N_{ir}}{N_s},$$

the code phase is changed $N_s$ chips forward according to step 616. In the example in FIG. 5, it is possible to estimate that the centre of gravity of the impulse response is approximately 26, in which case $$26 > \frac{32}{2} + \frac{32}{8} = 20,$$

when the threshold value $N_s$ is 8. In this case, the matched filter would be moved 8 steps forward. According to step 618, the calculation of the weighting value is done at certain predefined intervals and the calculation is continued as long as the signal is received.

According to a preferred embodiment of the invention, the finger correlators are controlled according to the centre of gravity changes in the RAKE receiver. When the centre of gravity of an impulse response pattern in a short matched filter changes one chip backward, for instance, the searcher informs all fingers that they should also change the code phase they track one chip backward.

The invention is preferably implemented by program, in which case the base station 220 is a microprocessor, and the means implementing the method of the invention are implemented as a software in it. The invention can naturally also be implemented by hardware providing the necessary functionality, for instance as an ASIC (application-specific integrated circuit) or using separate logic components.

Even though the invention has been explained in the above with reference to an example in accordance with the accompanying drawings, it is obvious that the invention is not restricted to it but can be modified in many ways within the scope of the inventive idea disclosed in the attached claims.

What is claimed is:

1. A method of processing multipath-propagated signal components in a communications system, in which
   a signal transmitted on a radio channel of the communications system is received in a RAKE receiver and
   an impulse response of the radio channel is formed in a delay estimator of the RAKE receiver on the basis of the received signal by correlating the received signal with a first matched filter, the method comprising:
   locating one or more taps having the highest signal energy in the impulse response,
   matching the one or more taps to a second matched filter shorter than the first matched filter,
   calculating a weighting value for the impulse response using statistical methods on the basis of the one or more taps in the second matched filter,
   comparing a deviation between the weighting value and a centre point of the second matched filter with a threshold value set for the deviation, moving the second matched filter forward when the deviation exceeds the threshold value set for exceeding the deviation, moving the second matched filter backward when the deviation undershoots the threshold value set for undershooting the deviation, and repeating the calculating a weighting value, comparing a deviation, moving the second matched filter forward and moving the second matched filter backward during reception of the signal.

2. The method of claim 1, further comprising:

defining a delay of each multipath-propagated signal component on the basis of the impulse response, allocating a correlator of the RAKE receiver to receive at least one multipath-propagated signal component and advising to the correlator the delay of the multipath-propagated signal component, receiving the signal in the correlator while taking into consideration the delay of the multipath-propagated signal component, if the weighting value changes, changing the delay advised to the correlator according to the change in the weighting value, and repeating the changing the delay if the weighting value changes always when the weighting value is calculated.

3. The method of claim 1 or 2, wherein the weighting value is calculated as an average of allocated correlator delays.

4. The method of claim 1 or 2, wherein the weighting value is calculated as a weighted average of the impulse response taps in such a manner that the value to be weighted is the location of the impulse response tap and the weight is the energy amount in the tap, according to the formula:

$$C_g = \frac{\sum_{k=1}^{N_{ir}} k \cdot R_k}{\sum_{k=1}^{N_{ir}} R_k}$$

wherein $C_g$ is the weighting value, $R_k$ is the energy of the impulse response taps, k is the index of impulse response taps, and $N_{ir}$ is the length of an impulse response window.

5. The method of claim 1 or 2, further comprising setting for the weighting value deviation a reference value $N_s$ indicating the smallest possible movement of the code phase of the second matched filter from the centre point of the second matched filter, and wherein:

moving the second matched filter backward comprises changing the location of the second matched filter $N_s$ code phases backward, if $$C_g \langle \frac{N_{ir}}{2} - \frac{N_{ir}}{N_s}$$

wherein $C_g$ is the weighting value and $N_{ir}$ is the length of an impulse response window, moving the second matched filter forward comprises changing the location of the second matched filter $N_s$ code phases forward, if $$C_g \rangle \frac{N_{ir}}{2} + \frac{N_{ir}}{N_s}, \text{ and}$$

repeating the last two steps always when the weighting value is calculated.

6. The method of claim 1 or 2, wherein the communications system is a cellular radio network implemented by a spread spectrum technique and employing code division multiple access (CDMA).

7. A RAKE receiver in a communications system, which receiver comprises:

means for receiving a signal transmitted on a radio channel of the communications system, one or more delay estimators for forming an impulse response of the radio channel on the basis of the received signal by correlating the received signal with a first matched filter, one or more correlators for tracking a multipath-propagated component of the received signal, means for locating one or more taps having the highest signal energy in the impulse response, means for matching the one or more taps to a second matched filter which is shorter than the first matched filter, means for comparing a deviation between a weighting value and a centre point of the second matched filter with a threshold value set for the deviation, means for moving the second matched filter onward when the deviation exceeds the threshold value set for exceeding the deviation, means for moving the second matched filter backward when the deviation undershoots the threshold value set for undershooting the deviation, and means for repeating the last four steps during the reception of the signal.

8. The RAKE receiver of claim 7, further comprising:

means for defining a delay of each multipath-propagated signal component on the basis of the impulse response, means for allocating a RAKE receiver correlator for receiving at least one multipath-propagated component and advising to the correlator the delay of the multipath-propagated component, means for receiving the signal in the correlator while taking into consideration the delay of the signal component, if the weighting value changes, means for changing the delay advised to the one or more correlators according to the change in the weighting value, and means for repeating the last step always when the weighting value is calculated.

9. The RAKE receiver of claim 7 or 8, further comprising means for calculating the weighting value as an average of the delays of the allocated correlators.

10. The RAKE receiver of claim 7 or 8, further comprising:

means for calculating the weighting value as a weighted average of the impulse response taps in such a manner that the value to be weighted is the location of the impulse response tap and the weight is the energy amount in the tap, according to the formula:

$$C_g = \frac{\sum_{k=1}^{N_{ir}} k \cdot R_k}{\sum_{k=1}^{N_{ir}} R_k}$$

wherein $C_g$ is the weighting value, $R_k$ is the energy of the impulse response taps, k is the index of impulse response taps, and $N_{1r}$ is the length of an impulse response window.

11. The RAKE receiver of claim 7 or 8 further comprising means for setting for the weighting value change a reference value $N_s$ indicating the smallest possible movement of the code phase of the matched filter, and wherein:
 means for moving the second matched filter backward comprises means for changing the location of the second matched filter by $N_s$ code phases backward, if $$C_g < \frac{N_{ir}}{2} - \frac{N_{ir}}{N_s},$$

wherein $C_g$ is the weighting value and $N_{ir}$ is the length of an impulse response window,
 means for moving the second matched filter forward comprises means for changing the location of the second matched filter by $N_s$ code phases forward, if $$C_g > \frac{N_{ir}}{2} + \frac{N_{ir}}{N_s}, \text{ and}$$

means for repeating the last two steps always when the weighting value is calculated.

12. The RAKE receiver of claim 7 or 8, wherein the communications system is a cellular radio network implemented by a spread spectrum technique and employing code division multiple access (CDMA).

13. A computer program product including computer program code to cause a microprocessor to perform a method of processing multipath-propagated signal components in a communications system, in which
 a signal transmitted on a radio channel of the communications system is received in a RAKE receiver and
 an impulse response of the radio channel is formed in a delay estimator of the RAKE receiver on the basis of the received signal by correlating the received signal with a first matched filter, the method comprising:
 locating one or more taps having the highest signal energy in the impulse response,
 matching the one or more taps to a second matched filter shorter than the first matched filter,
 calculating a weighting value for the impulse response using statistical methods on the basis of the one or more taps in the second matched filter,
 comparing a deviation between the weighting value and a centre point of the second matched filter with a threshold value set for the deviation,
 moving the second matched filter forward when the deviation exceeds the threshold value set for exceeding the deviation,
 moving the second matched filter backward when the deviation undershoots the threshold value set for undershooting the deviation, and
 repeating the calculating a weighting value, comparing a deviation, moving the second matched filter forward and moving the second matched filter backward during reception of the signal.

14. The computer program product of claim 13, wherein the method further comprises:
 defining a delay of each multipath-propagated signal component on the basis of the impulse response,
 allocating a correlator of the RAKE receiver to receive at least one multipath-propagated signal component and advising to the correlator the delay of the multipath-propagated signal component,
 receiving the signal in the correlator while taking into consideration the delay of the multipath-propagated signal component,
 if the weighting value changes, changing the delay advised to the correlator according to the change in the weighting value, and
 repeating the changing the delay if the weighting value changes always when the weighting value is calculated.

15. The computer program product of claim 13 or 14, wherein the weighting value is calculated as an average of allocated correlator delays.

16. The computer program product of claim 13 or 14, wherein the weighting value is calculated as a weighted average of the impulse response taps in such a manner that the value to be weighted is the location of the impulse response tap and the weight is the energy amount in the tap, according to the formula:

$$C_g = \frac{\sum_{k=1}^{N_{ir}} k \cdot R_k}{\sum_{k=1}^{N_{ir}} R_k}$$

wherein $C_g$ is the weighting value, $R_k$ is the energy of the impulse response taps, k is the index of impulse response taps, and $N_{ir}$ is the length of an impulse response window.

17. The computer program product of claim 13 or 14, the method further comprising setting for the weighting value deviation a reference value $N_s$ indicating the smallest possible movement of the code phase of the second matched filter from the centre point of the second matched filter, and wherein:
 moving the second matched filter backward comprises changing the location of the second matched filter $N_s$ code phases backward, if $$C_g < \frac{N_{ir}}{2} - \frac{N_{ir}}{N_s}$$

wherein $C_g$ is the weighting value and $N_{ir}$ is the length of an impulse response window,
 moving the second matched filter forward comprises changing the location of the second matched filter $N_s$ code phases forward, if $$C_g > \frac{N_{ir}}{2} + \frac{N_{ir}}{N_s}, \text{ and}$$

repeating the last two steps always when the weighting value is calculated.

18. The computer program product of claim 13 or 14, wherein the communications system is a cellular radio network implemented by a spread spectrum technique and employing code division multiple access (CDMA).

* * * * *